(12) United States Patent
Mizoguchi et al.

(10) Patent No.: US 12,718,057 B2
(45) Date of Patent: Aug. 25, 2026

(54) DUAL CHANNEL NETWORK FOR MULTIVARIATE TIME SERIES RETRIEVAL WITH STATIC STATUSES

(71) Applicant: NEC Laboratories America, Inc., Princeton, NJ (US)

(72) Inventors: Takehiko Mizoguchi, Princeton, NJ (US); Liang Tong, Lawrenceville, NJ (US); Wei Cheng, Princeton Junction, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 868 days.

(21) Appl. No.: 18/161,428

(22) Filed: Jan. 30, 2023

(65) Prior Publication Data

US 2023/0267305 A1 Aug. 24, 2023

Related U.S. Application Data

(60) Provisional application No. 63/313,096, filed on Feb. 23, 2022.

(51) Int. Cl.
*G06N 3/044* (2023.01)
*G06N 3/08* (2023.01)

(52) U.S. Cl.
CPC ............... *G06N 3/044* (2023.01); *G06N 3/08* (2013.01)

(58) Field of Classification Search
CPC ........ G06N 3/044; G06N 3/08; G06N 3/0499; G06N 3/09
See application file for complete search history.

(56) References Cited

U.S. PATENT DOCUMENTS 8,880,415 B1 * 11/2014 Eck ......................... G10L 25/27 704/502
2015/0012274 A1 * 1/2015 Lee ......................... G10L 15/02 704/251
2019/0034497 A1 * 1/2019 Song .................. G06F 16/2477
2021/0065059 A1 3/2021 Song et al.
2022/0012538 A1 1/2022 Mizoguchi et al.
2022/0019892 A1 1/2022 Ni et al.
2022/0021822 A1 * 1/2022 Valdes Garcia ....... G03B 15/00
2022/0075822 A1 3/2022 Lumezanu et al.

* cited by examiner

*Primary Examiner* — Yossef Korang-Beheshti
(74) *Attorney, Agent, or Firm* — Vincent Duffy

(57) ABSTRACT

A computer implemented method is provided. The method includes jointly encoding, by a dual-channel feature extractor, a current time series segment with corresponding static statuses into a compact feature. The method further includes converting, by a binary code extractor, the compact feature into a binary code. The method also includes computing distances between the binary code and all binary codes stored in a binary code database. The method additionally includes retrieving the top relevant multivariate time series segments based on the distances.

18 Claims, 8 Drawing Sheets

DUAL CHANNEL NETWORK FOR MULTIVARIATE TIME SERIES RETRIEVAL WITH STATIC STATUSES

RELATED APPLICATION INFORMATION

This application claims priority to U.S. Provisional Patent Application No. 63/313,096, filed on Feb. 23, 2022, incorporated herein by reference in its entirety.

BACKGROUND

Technical Field

The present invention generally relates to time series processing and more particularly to a dual channel network for multivariate time series retrieval with static statuses.

Description of the Related Art

Multivariate time series retrieval is the task of finding the most relevant multivariate time series segments from a huge amount of historical data by querying with a current observation. A feasible way to perform multivariate time series retrieval is to obtain compact representation of the historical data with binary codes that preserve relative similarity relation in raw input space. However, the system status is not always determined only by time series that describes the dynamic system behavior but sometimes also by static status of the system.

SUMMARY

According to aspects of the present invention, a computer implemented method is provided. The method includes jointly encoding, by a dual-channel feature extractor, a current time series segment with corresponding static statuses into a compact feature. The method further includes converting, by a binary code extractor, the compact feature into a binary code. The method also includes computing distances between the binary code and all binary codes stored in a binary code database. The method additionally includes retrieving the top relevant multivariate time series segments based on the distances.

According to other aspects of the present invention, a computer program product is provided. The computer program product includes a non-transitory computer readable storage medium having program instructions embodied therewith. The program instructions are executable by a computer to cause the computer to perform a method. The method includes jointly encoding, by a dual-channel feature extractor implemented by one or more hardware processors of the computer, a current time series segment with corresponding static statuses into a compact feature. The method further includes converting, by a binary code extractor implemented by the one or more hardware processors, the compact feature into a binary code. The method also includes computing, by the one or more hardware processors, distances between the binary code and all binary codes stored in a binary code database. The method additionally includes retrieving, by the one or more hardware processors, the top relevant multivariate time series segments based on the distances.

According to still other aspects of the present invention, a computer processing system is provided. The computer processing system includes a memory device for storing program code. The computer processing system further includes one or more hardware processors for running the program code to jointly encode, by a dual-channel feature extractor implemented by the one or more hardware processors, a current time series segment with corresponding static statuses into a compact feature. The one or more hardware processors further run the program code to convert, by a binary code extractor implemented by the one or more hardware processors, the compact feature into a binary code. The one or more hardware processors also run the program code to compute distances between the binary code and all binary codes stored in a binary code database. The one or more hardware processors additionally run the program code to retrieve the top relevant multivariate time series segments based on the distances.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to a dual channel network for multivariate time series retrieval with static statuses.

One or more embodiments of the present invention provide an end-to-end neural network model architecture that also considers static statuses as well as time series inputs for more accurate multivariate time series retrieval.

As mentioned above, conventional state-of-the-art techniques for time series retrieval assume the system status is determined only by dynamic behavior represented as time series. However, in practice, the system status is also affected by static observations such as operational mode, day of the week. A recurrent neural network based time series encoder, which is typically used for time series retrieval, cannot handle such static inputs since it assumes temporal dependency among time stamps.

One or more embodiments of the present invention address time series retrieval tasks for systems whose status is determined not only by dynamic behavior but also by static profiles. Embodiments of the present invention incorporate a multi-layer perceptron based static encoder as well as a recurrent neural network based temporal encoder. These encoders are jointly trained in end-to-end manner based on metric learning loss such as triplet loss.

Hence, in an embodiment, at least one of the following two inventive features can be involved: (1) Multiple Layer Perceptron (MLP) based static encoder is jointly trained with a Recurrent Neural Network (RNN) based time series encoder; (2) metric learning loss enables us to train binary codes that preserve relative similarity between input raw time series as well as static statuses.

The task of multivariate time series retrieval can be applied to many tasks in complex systems including system status identification, fault detection and fault prediction to name a few exemplary tasks to which embodiments of the present invention can be applied.

As used herein, "static statuses" refer to system statuses represented that do not change within the same consecutive time points as time series segments. The difference between static statuses and time series is the frequency of change. While time series changes every moment, static statuses changes only at certain time intervals.

Figure 1:
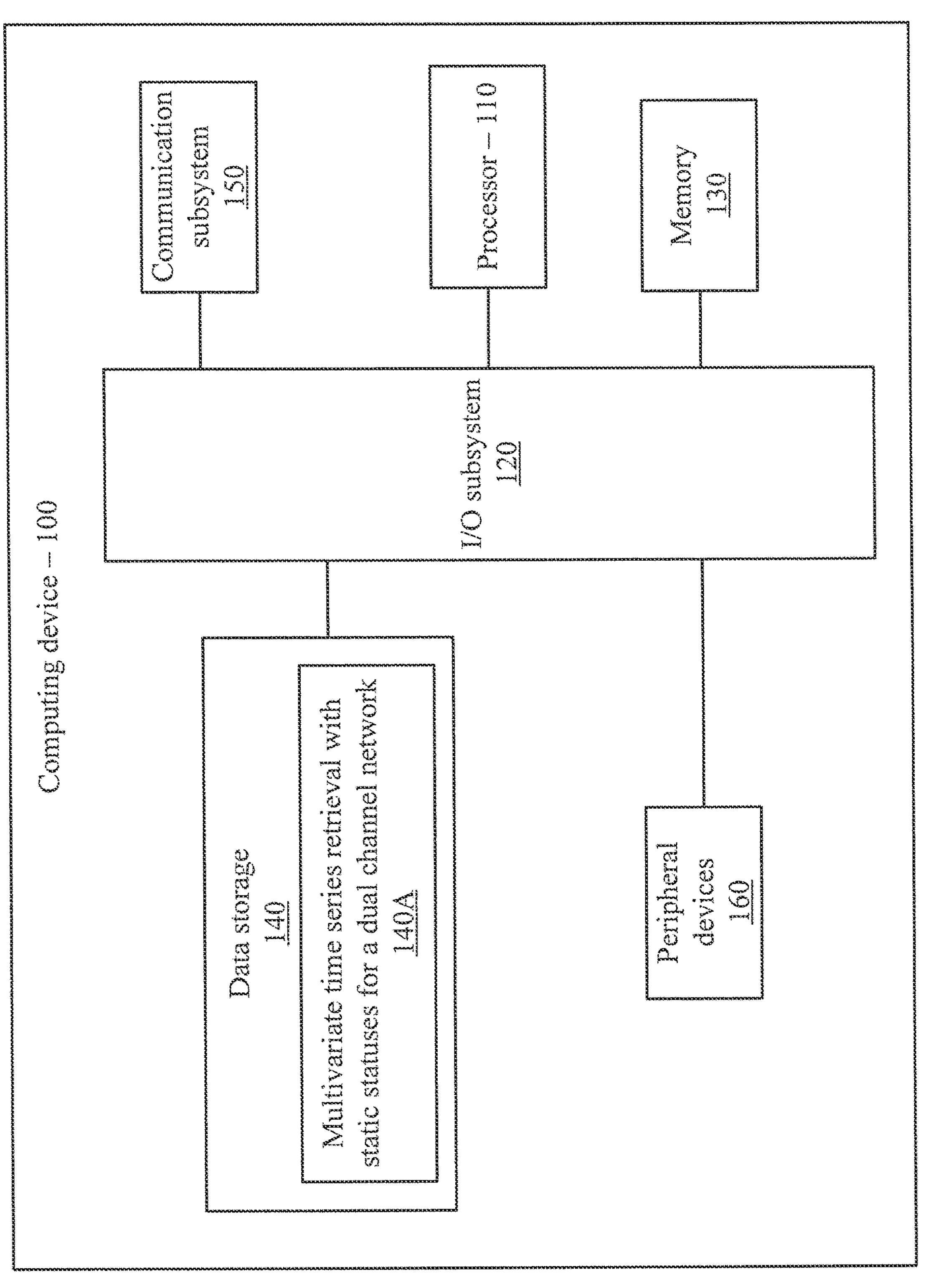
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to perform multivariate time series retrieval with static statuses for a dual channel network.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code 140A for multivariate time series retrieval with static statuses for a dual channel network. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices. The peripheral devices can also include motor vehicle systems including steering, braking, accelerating, lighting, stability, and so forth, as described herein.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" or "processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
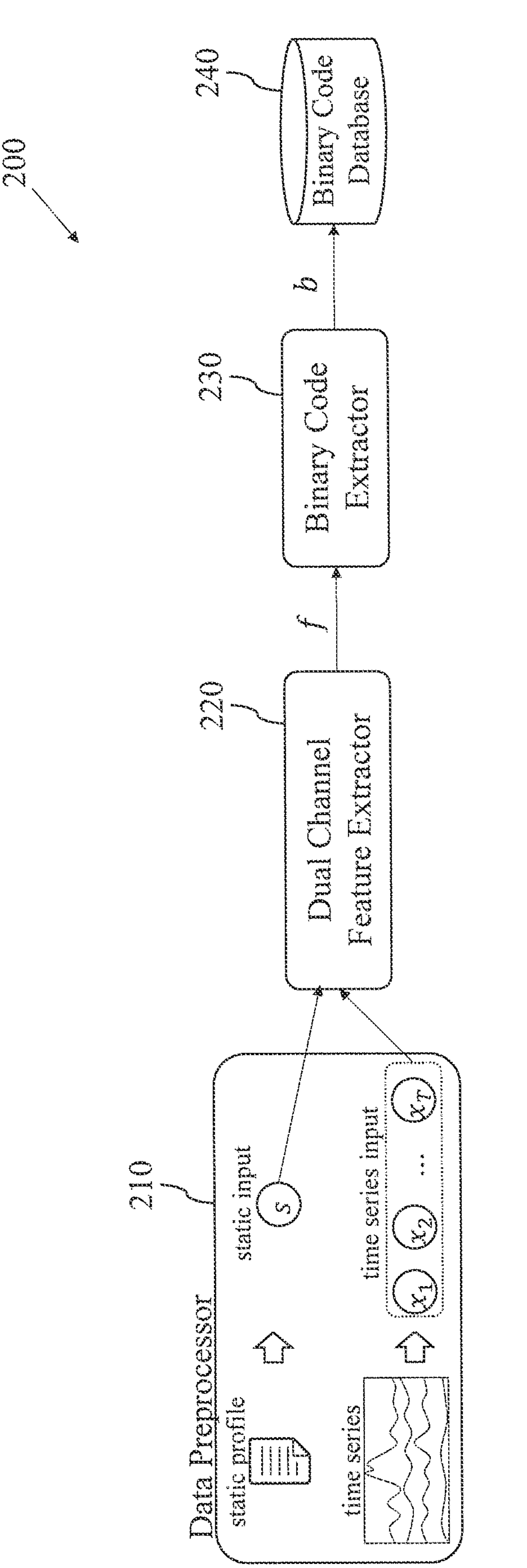
FIG. 2 is a block diagram showing an exemplary dual channel feature extractor, in accordance with an embodiment of the present invention.
Figure 3:
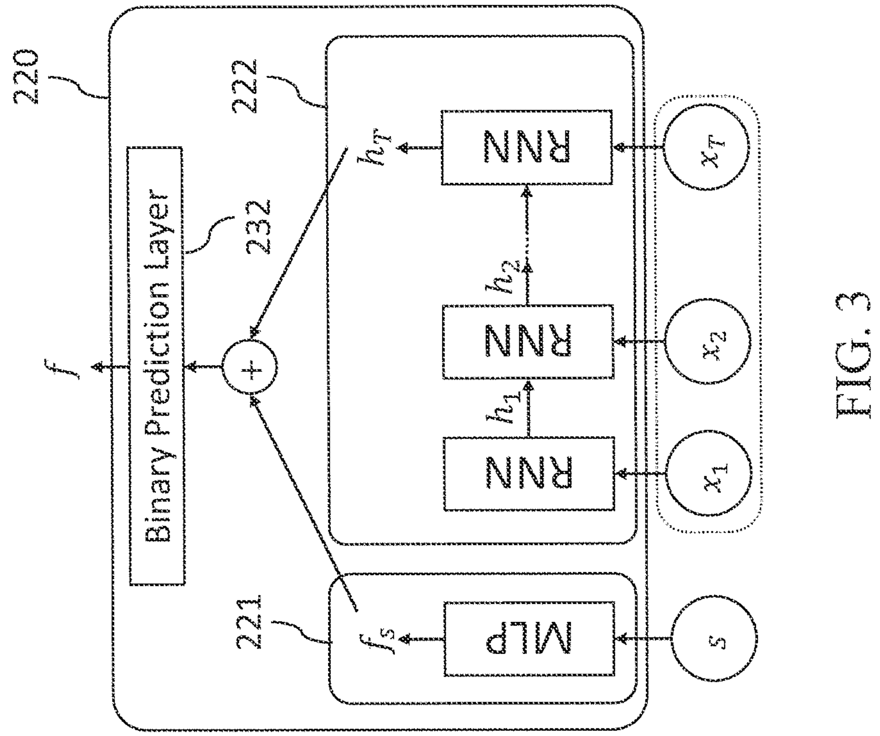
FIG. 3 is a block diagram showing the dual channel feature extractor of FIG. 2, in accordance with an embodiment of the present invention.

These and other variations of a hardware processor subsystem are also contemplated in accordance with embodiments of the present invention FIG. 2 is a block diagram showing an exemplary dual channel feature extractor 200, in accordance with an embodiment of the present invention. FIG. 3 is a block diagram showing the dual channel feature extractor 220 of FIG. 2, in accordance with an embodiment of the present invention.

The dual channel feature extractor 200 includes a data preprocessor 210, a dual channel feature extractor 220, a binary code extractor 230, and a binary code database 240. In FIGS. 2 and 3, "f" denotes a feature vector, "b" denotes a binary code, and "h" denotes a hidden layer output.

The data preprocessor 210 preprocesses raw data to extract static status as well as time series for each time step. Specifically, for a consecutive T number of time points, a time series segment $X_t=[x_t, x_{t+1}, \ldots x_{t+T-1}]\in \mathbb{R}^{d_1\times T}$ are extracted from the raw time series, and static statuses $s_t\in \mathbb{R}^{d_2}$ are extracted from the raw static profile, at each time point t=0, 1, . . . , L, where L is the length of whole raw time series.

The dual channel feature extractor 220 jointly encodes the static status and the time series, which are preprocessed by data preprocessor 210 into compact representations. The dual channel feature extractor 220 includes a network architecture based on a Multi-Layer Perceptron (MLP) 221 and a Recurrent Neural Network (RNN) 222. The dual channel feature extractor 220 further includes a binary prediction layer 232 which reshapes the size of features from the concatenation of the outputs of the MLP 221 and RNN 222 and predicts binary codes.

The binary code extractor 230 converts the compact representations encoded by the dual channel feature extractor 220 into binary codes by checking the sign of all entries in the feature vector.

The binary code database 240 stores all the historical binary codes, which are extracted by the binary code extractor 230.

In an embodiment, the present invention has three stages: a training stage; a hashing stage; and a retrieval stage. In the training stage, network parameters of the dual-channel feature extractor 220 are trained on all historical time series and their static statuses. After the training stage, all historical time series and static statuses are encoded into binary codes based on the dual-channel feature extractor 220 trained in the training stage, and then stored in the binary code database 240. In the retrieval stage, for each incoming time series and static statuses, the most relevant time series as well as static statuses are retrieved by comparing extracted binary codes to all historical ones in the binary code database 240.

Figure 4:
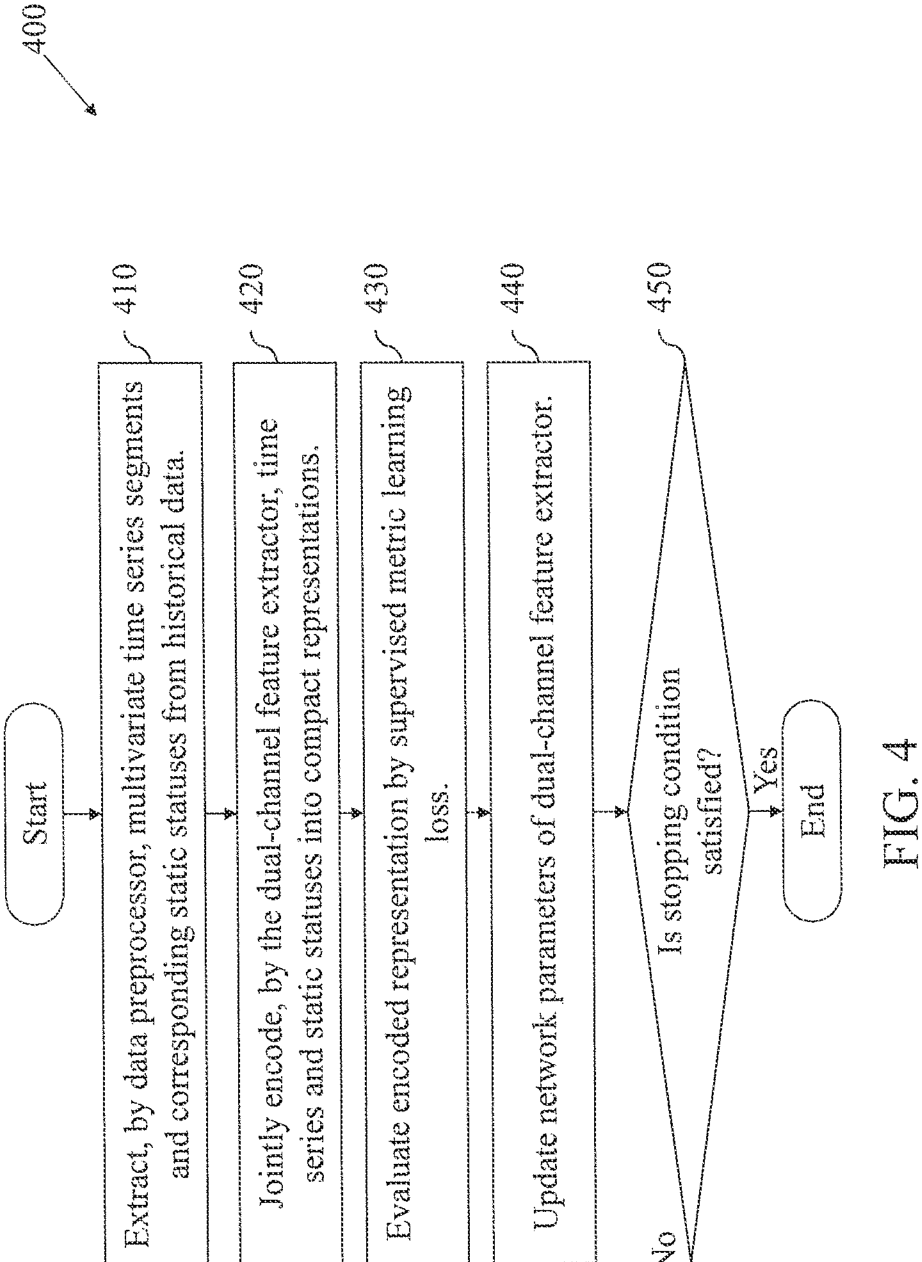
FIG. 4 is a flow diagram showing an exemplary training method, in accordance with an embodiment of the present invention.

FIG. 4 is a flow diagram showing an exemplary training method 400, in accordance with an embodiment of the present invention.

At block 410, extract, by the data preprocessor 210, multivariate time series segments and corresponding static statuses from historical data.

At block 420, jointly encode, by the dual-channel feature extractor 220, the multivariate time series segments and the corresponding static statuses into compact representations. It is to be appreciated that the terms "compact features" and "compact representations" are used interchangeably herein. A compact feature is a feature having a certain dimension, which is much smaller than the multiplication of the original dimension and the length of time series segments.

At block 430, evaluate the encoded representation by supervised metric learning loss.

At block 440, update network parameters of the dual-channel feature extractor 220.

At block 450, determine if the stopping condition is satisfied. If so, then terminate the method. Otherwise, return to step 420.

In the training stage, further regarding block 410, multivariate time series segments (a slice of multivariate time series that lasts for a certain time steps) and corresponding static status are extracted. Multivariate time series segments are extracted from entire multivariate time series by a sliding window.

Further regarding block 420, time series segments with static statuses are encoded by the dual-channel feature extractor 220 into compact representations.

Specifically, a time series segment $X_t=[x_t, x_{t+1}, \ldots x_{t+T-1}]\in \mathbb{R}^{d_1\times T}$ with static statuses $s_t\in \mathbb{R}^{d_2}$ at time t are encoded into a latent representation $f_t\in \mathbb{R}^{d_0}$ by $$f_t=g(f_s\oplus h_T),$$

where $f_s=\mathrm{MLP}(s_t)\in \mathbb{R}^{d_s}$ and $h_T=\mathrm{RNN}(X_t)\in \mathbb{R}^{d_t}$ are respectively the output of MLP from $s_t$ and the hidden representation of the last step of RNN from $X_t$, '$\oplus$' represents the vector concatenation, and g: $\mathbb{R}^{d_s+d_t}\rightarrow \mathbb{R}^{d_o}$ is the binary prediction function (layer), which is typically represented as fully-connected layer.

Further regarding block 430, the encoded representation is evaluated by supervised metric learning loss, e.g., triplet loss:

$$\ell_{triplet} := \sum_{a,p,n} (s_{ap} - s_{an} + \alpha)_+,$$

where $(\cdot)_+:=\max(0, \cdot)$, $s_{aq}:=\|\tanh(f_a)-\tanh(f_q)\|(q \in \{p,n\})$, and $f_a$, $f_p$, $f_n$ are features extracted by the dual-channel feature extractor 220 respectively from an anchor, positive and negative input samples. Each sample must have a time series segment and can also has static statuses.

Anchor samples are randomly selected from all data segments, positive samples are randomly selected from data samples which belongs to the same classes as anchors, and negative samples are randomly selected from data samples which belongs to different classes from anchors.

Further regarding block 440, model parameters of the dual-channel feature extractor 220 are updated so that the loss function is smaller based on stochastic gradient descent.

Further regarding block 450, if the stopping condition is not satisfied, then the training loop is repeated from block 320, If stopping condition is satisfied, then the training stage is finished.

Figure 5:
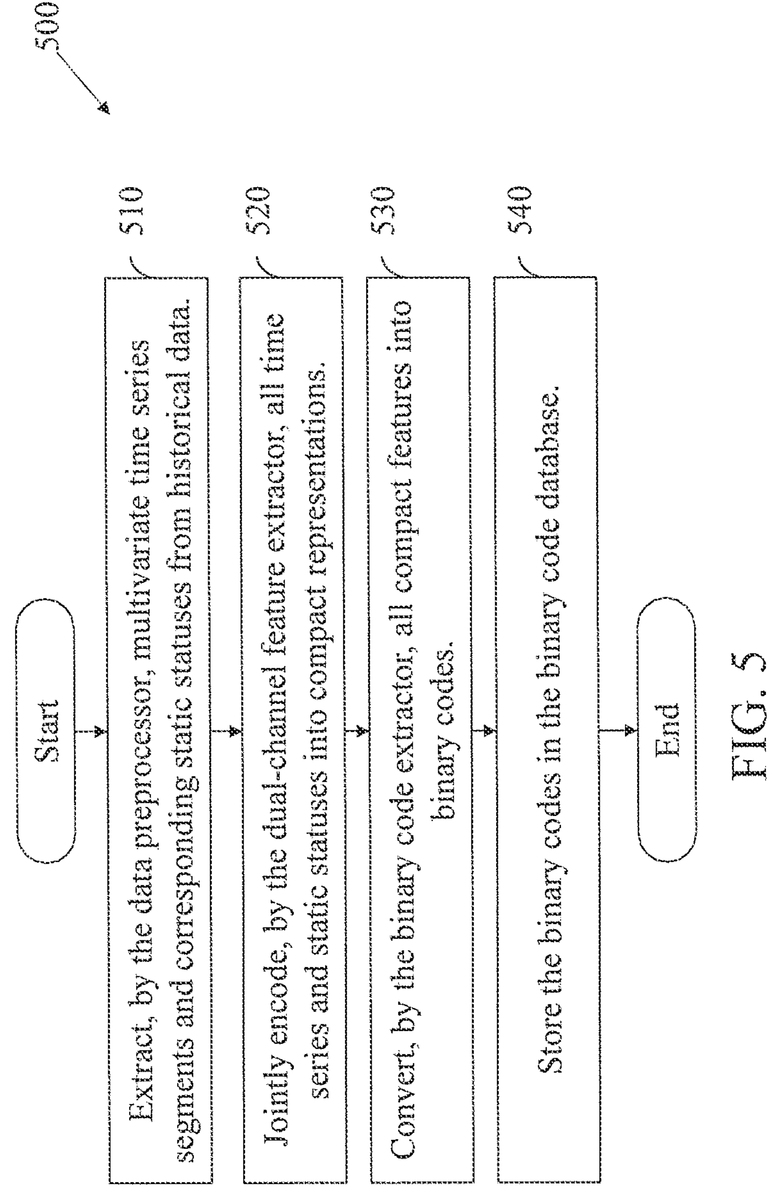
FIG. 5 is a flow diagram showing an exemplary hashing stage, in accordance with an embodiment of the present invention.

FIG. 5 is a flow diagram showing an exemplary hashing stage 500, in accordance with an embodiment of the present invention.

At block 510, extract, by the data preprocessor 210, multivariate time series segments and corresponding static statuses from historical data.

At block 520, jointly encode, by the dual-channel feature extractor 220, all of the multivariate time series segments and the corresponding static statuses into compact representations.

At block 530, convert, by the binary code extractor 230, all compact representations into binary codes.

At block 540, store the binary codes in the binary code database 240.

Further regarding block 510, multivariate time series segments and corresponding static status are extracted.

Further regarding block 520, all of the multivariate time series segments with the corresponding static statuses are encoded by the dual-channel feature extractor 220, which is trained in the training stage, into compact representations.

Further regarding block 530, all compact representations obtained in block 220 are converted into binary vectors by checking the sign of all entries of the compact representations.

Figure 6:
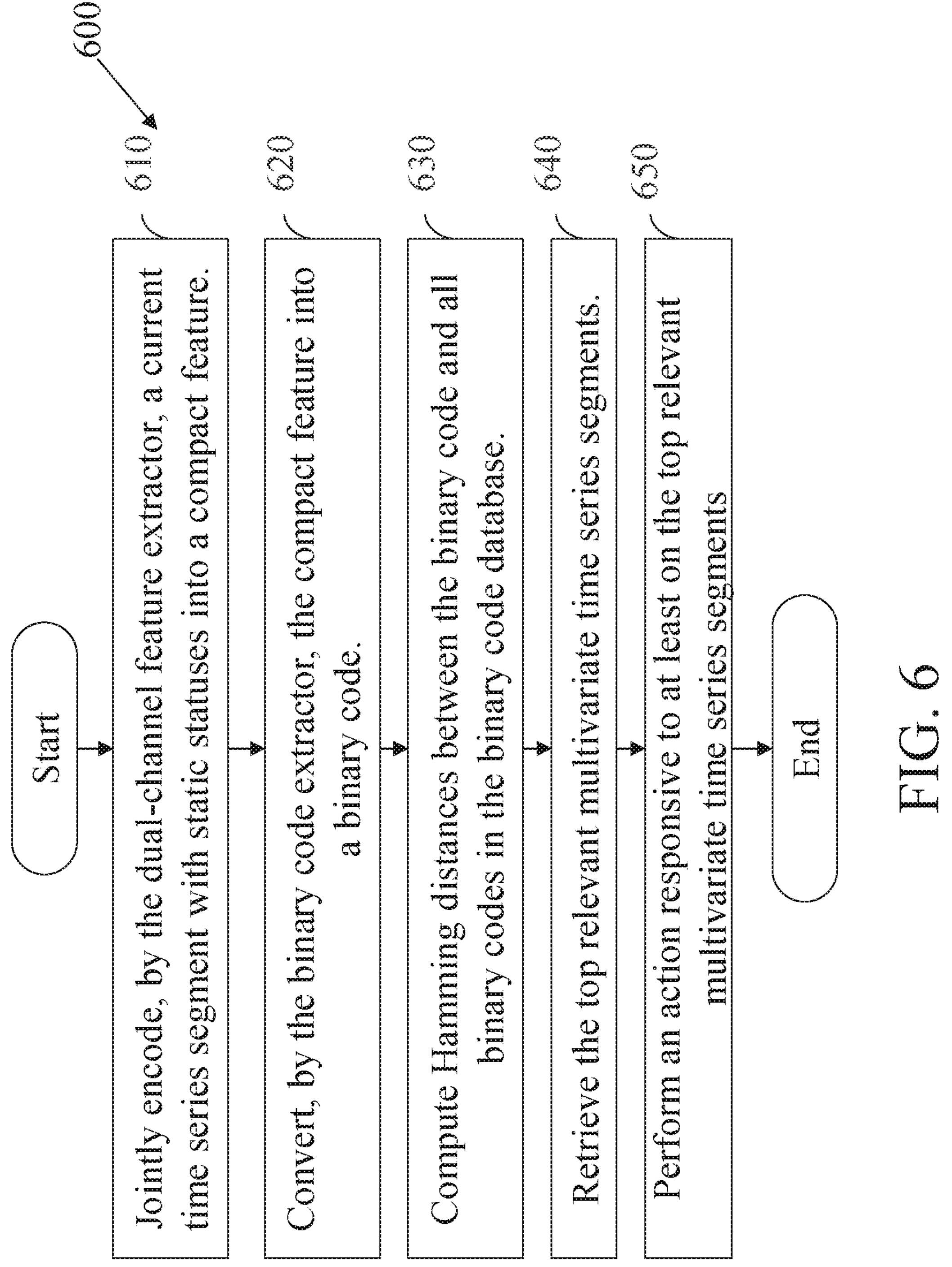
FIG. 6 is a flow diagram showing an exemplary retrieval stage, in accordance with an embodiment of the present invention.

FIG. 6 is a flow diagram showing an exemplary retrieval stage 600, in accordance with an embodiment of the present invention.

At block 610, jointly encode, by the dual-channel feature extractor 220, a current time series segment with static statuses into a compact representation.

At block 620, convert, by the binary code extractor 230, the compact representation into a binary code.

At block 630, compute Hamming (or other) distances between the binary code and all binary codes in the binary code database 240.

At block 640, retrieve the top relevant multivariate time series segments based on the distance, where the shorter the distance, the more relevant the multivariate time series segments.

At block 650, perform an action responsive to at least on the top relevant multivariate time series segments. For example, the top relevant multivariate times series segments can indicate an impending collision by a motor vehicle. In such a case, accident avoidance measures involving controlling one or more systems of a motor vehicle such as steering, braking, accelerating, stability, lighting, and so forth.

Further regarding block 610, for a current observed time series segment with static statuses, a compact representation (feature) is extracted based on the dual-channel feature extractor 220 learned in the training stage.

Further regarding block 620, the compact representation extracted in block 610 is converted into a binary code by checking signs of all entries in the feature vector embodying the compact representation.

Further regarding block 630, the Hamming distances between the binary code converted in block 320 and all binary codes in the binary code database 230 are computed.

Figure 7:
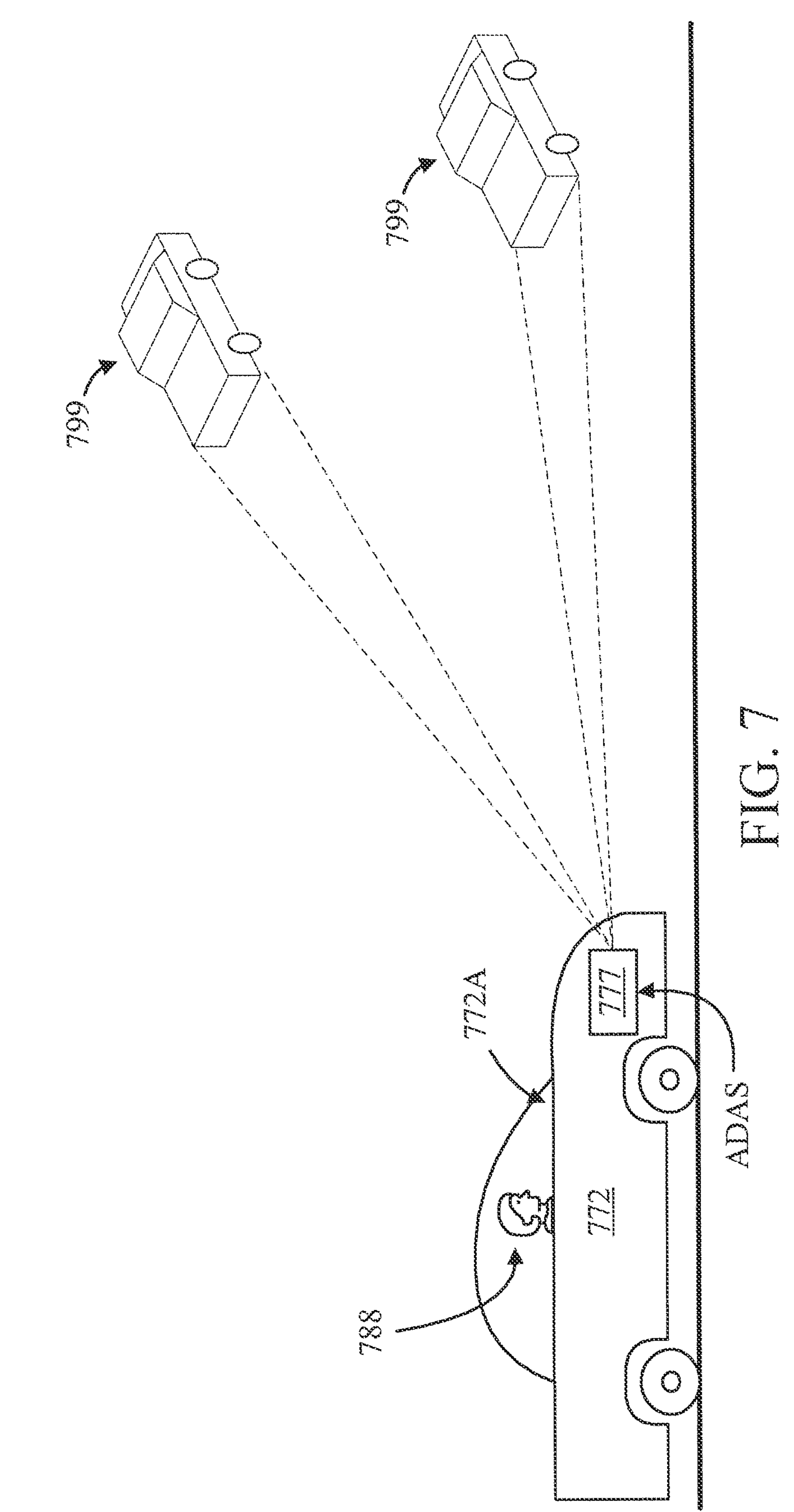
FIG. 7 is a block diagram showing an exemplary environment to which the present invention can be applied, in accordance with an embodiment of the present invention.

FIG. 7 is a block diagram showing an exemplary environment 700 to which the present invention can be applied, in accordance with an embodiment of the present invention.

In the environment 700, a user 788 is located in a scene with multiple objects 799, each having their own locations and trajectories. The user 788 is operating a vehicle 772 (e.g., a car, a truck, a motorcycle, etc.) having an ADAS 777.

The ADAS 777 receives one or more of the top multivariate time series segments.

Responsive to the one or more of the top multivariate time series segments, a vehicle controlling decision is made. To that end, the ADAS 777 can control, as an action corresponding to a decision, for example, but not limited to, steering, braking, and accelerating systems.

Thus, in an ADAS situation, steering, accelerating/braking, friction (or lack of friction), yaw rate, lighting (hazards, high beam flashing, etc.), tire pressure, turn signaling, and more can all be efficiently exploited in an optimized decision in accordance with the present invention.

The system of the present invention (e.g., system 777) may interface with the user through one or more systems of the vehicle 772 that the user is operating. For example, the system of the present invention can provide the user information through a system 772A (e.g., a display system, a speaker system, and/or some other system) of the vehicle 772. Moreover, the system of the present invention (e.g., system 777) may interface with the vehicle 772 itself (e.g., through one or more systems of the vehicle 772 including, but not limited to, a steering system, a braking system, an acceleration system, a steering system, a lighting (turn signals, headlamps) system, etc.) in order to control the vehicle and cause the vehicle 772 to perform one or more actions. In this way, the user or the vehicle 772 itself can navigate around these objects 799 to avoid potential collisions there between. The providing of information and/or the controlling of the vehicle can be considered actions that are determined in accordance with embodiments of the present invention.

While described with respect to an ADAS, the present invention can be applied to a myriad of applications involving, e.g., a trajectory. For example, navigation involving automated agents, robots, assistive technologies for blind people, and/or so forth can be exploited by embodiments of the present invention.

Figure 8:
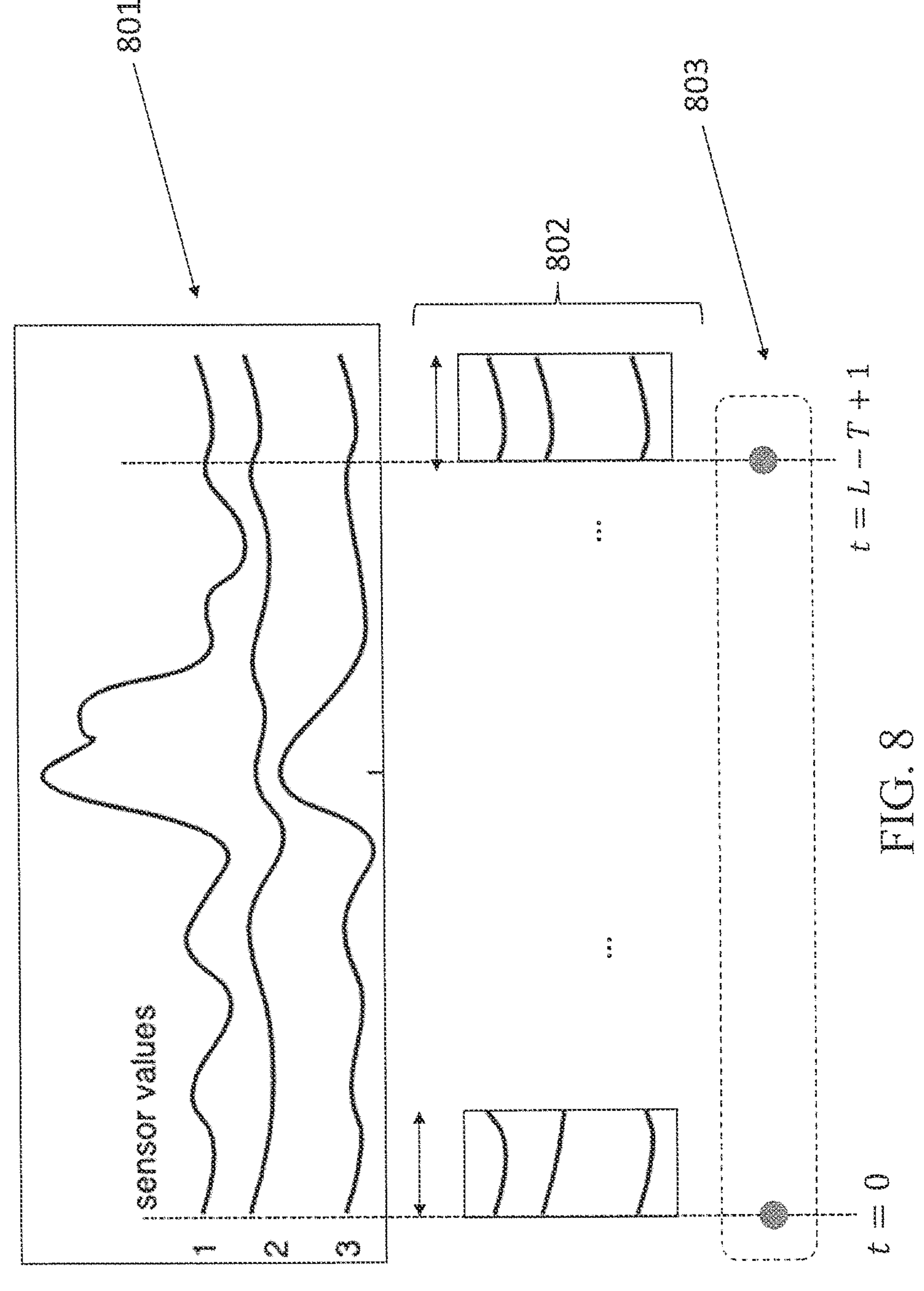
FIG. 8 is a diagram showing exemplary time series, time series segments, and static statuses, in accordance with an embodiment of the present invention.

FIG. 8 is a diagram showing exemplary time series 801, time series segments 802, and static statuses 803, in accordance with an embodiment of the present invention.

The time series 801 represents the entire overall time series. The time series segments 802 represent various portions of the time series 801. The static statuses 803 are system statuses that do not change within the same consecutive time points as time series segments 802. The difference between static statuses 803 and time series 801 is the frequency of change. While time series 801 changes every moment, static statuses 803 change only at certain time intervals.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method, comprising:

jointly encoding, by a dual-channel feature extractor, a current time series segment with corresponding static statuses into a compact feature, wherein the dual-channel feature extractor includes a multi-layer perceptron and a recurrent neural network whose respective outputs are combined by a combining element into a binary prediction layer;

converting, by a binary code extractor, the compact feature into a binary code;

computing distances between the binary code and all binary codes stored in a binary code database; and retrieving the multivariate time series segments based on the distances; and performing an action responsive to at least one of the multivariate time series segments, wherein the multivariate times series segments indicate an impending collision by a motor vehicle and the action responsive is an action avoidance measure controlling a steering system, a braking system, or an accelerating system to avoid a potential collision.

2. The computer-implemented method of claim 1, further comprising:

extracting, by a data preprocessor, multivariate time series segments and corresponding static statuses from historical data;

jointly encoding, by the dual-channel feature extractor, the multivariate time series segments and the corresponding static statuses into compact features having a certain dimension which is much smaller than a multiplication of an original dimension and a length of the multivariate time series segments;

performing an evaluation of the encoded compact features by supervised metric learning loss to provide compact features that preserve a local similarity of multivariate time series segments and the corresponding static statuses in an input space;

updating network parameters of the dual-channel feature extractor based on results of the evaluation to reduce a loss of a loss function based on stochastic gradient descent; and repeating said jointly encoding, evaluating, and updating steps until a stopping condition is reached to provide a trained dual-channel feature extractor.

3. The computer-implemented method of claim 2, further comprising:

converting the compact features into binary codes; and storing the binary codes in a binary code database.

4. The computer-implemented method of claim 2, further comprising extracting the multivariate time series segments from an overall time series using a sliding window.

5. The computer-implemented method of claim 2, wherein the evaluation comprises identifying and extracting features from anchor, positive, and negative samples corresponding to the time series segments.

6. The computer-implemented method of claim 5, wherein the anchor samples are randomly selected from the time series segments, the positive samples are randomly selected from data samples which belong to the same classes as the anchor samples, and the negative samples are selected randomly from data samples which belong to different classes from the anchor samples.

7. The computer-implemented method of claim 1, wherein the binary prediction layer reshapes a feature size of the compact features and predicts binary codes.

8. The computer-implemented method of claim 1, wherein an output of the multi-layer perceptron is taken from a last hidden representation in the multi-layer perceptron.

9. The computer-implemented method of claim 1, wherein the binary prediction layer is a fully-connected layer.

10. A computer program product, the computer program product comprising a non-transitory computer readable storage medium having program instructions embodied therewith, the program instructions executable by a computer to cause the computer to perform a method comprising:

jointly encoding, by a dual-channel feature extractor implemented by one or more hardware processors of the computer, a current time series segment with corresponding static statuses into a compact feature, wherein the dual-channel feature extractor includes a multi-layer perceptron and a recurrent neural network whose respective outputs are combined by a combining element into a binary prediction layer;

converting, by a binary code extractor implemented by the one or more hardware processors, the compact feature into a binary code;

computing, by the one or more hardware processors, distances between the binary code and all binary codes stored in a binary code database; and retrieving, by the one or more hardware processors, the multivariate time series segments based on the distances; and perform an action responsive to at least one of the multivariate time series segments, wherein the multivariate times series segments indicate an impending collision by a motor vehicle and the action responsive is an action avoidance measure controlling a steering system, a braking system, or an accelerating system to avoid a potential collision.

11. The computer program product of claim 10, wherein the program product further comprises:

extracting, by a data preprocessor, multivariate time series segments and corresponding static statuses from historical data;

jointly encoding, by the dual-channel feature extractor, the multivariate time series segments and the corresponding static statuses into compact features having a certain dimension which is much smaller than a multiplication of an original dimension and a length of the multivariate time series segments;

performing an evaluation of the encoded compact features by supervised metric learning loss to provide compact features that preserve a local similarity of multivariate time series segments and the corresponding static statuses in an input space;

updating network parameters of the dual-channel feature extractor based on results of the evaluation to reduce a loss of a loss function based on stochastic gradient descent; and repeating said jointly encoding, evaluating, and updating steps until a stopping condition is reached to provide a trained dual-channel feature extractor.

12. The computer program product of claim 11, wherein the method further comprises:

converting the compact features into binary codes; and storing the binary codes in a binary code database.

13. The computer program product of claim 11, wherein the method further comprises extracting the multivariate time series segments from an overall time series using a sliding window.

14. The computer program product of claim 11, wherein the evaluation comprises identifying and extracting features from anchor, positive, and negative samples corresponding to the time series segments.

15. The computer program product of claim 14, wherein the anchor samples are randomly selected from the time series segments, the positive samples are randomly selected from data samples which belong to the same classes as the anchor samples, and the negative samples are selected randomly from data samples which belong to different classes from the anchor samples.

16. The computer program product of claim 10, wherein the binary prediction layer reshapes a feature size of the compact features and predicts binary codes.

17. The computer program product of claim 10, wherein an output of the multi-layer perceptron is taken from a last hidden representation in the multi-layer perceptron.

18. A computer processing system, comprising:

a memory device for storing program code; and one or more hardware processors for running the program code to jointly encode, by a dual-channel feature extractor implemented by the one or more hardware processors, a current time series segment with corresponding static statuses into a compact feature, wherein the dual-channel feature extractor includes a multi-layer perceptron and a recurrent neural network whose respective outputs are combined by a combining element into a binary prediction layer;

convert, by a binary code extractor implemented by the one or more hardware processors, the compact feature into a binary code;

compute distances between the binary code and all binary codes stored in a binary code database; and retrieve the multivariate time series segments based on the distances and perform an action responsive to at least one of the multivariate time series segments, wherein the multivariate times series segments indicate an impending collision by a motor vehicle and the action responsive is an action avoidance measure controlling a steering system, a braking system, or an accelerating system to avoid a potential collision.

* * * * *